M. FRAIZER.
SEED DROPPING PLATE FOR PLANTERS.
APPLICATION FILED JAN. 18, 1915.

1,164,490.

Patented Dec. 14, 1915.

Inventor
M. Fraizer

UNITED STATES PATENT OFFICE.

MARK FRAIZER, OF SHERMAN, OKLAHOMA.

SEED-DROPPING PLATE FOR PLANTERS.

1,164,490.

Specification of Letters Patent. Patented Dec. 14, 1915.

Application filed January 18, 1915. Serial No. 2,930.

*To all whom it may concern:*

Be it known that I, MARK FRAIZER, a citizen of the United States, residing at Sherman, in the county of Major and State of Oklahoma, have invented certain new and useful Improvements in Seed-Dropping Plates for Planters; and I do hereby declare the following to be a full, clear, and exact description of the invention, such as will enable others skilled in the art to which it appertains to make and use the same.

This invention relates to a seed dropping plate for use in connection with ordinary corn planters, and the primary object of the invention is to provide a dropping attachment for dropping or planting cane or Kafir corn seed or grains at predetermined intervals, and in spaced relation to each other in rows, for insuring a good stand of the grain.

Another object of this invention is to provide a plate for attachment to an ordinary seed dispensing hopper of an ordinary corn planter which has a plurality of semi-circular annular grooves formed in the face thereof and a second plate rotatably mounted above said grooved plate and provided with slots formed therein at spaced intervals about the circumference of the plate for receiving the seeds and guiding them about said groove and dropping them through openings in the plate for planting.

With the foregoing and other objects in view this invention consists in such novel features of construction, combination and arrangement of parts as will be hereinafter more fully described illustrated in the accompanying drawings and claimed.

In describing the invention in detail reference will be had to the accompanying drawings wherein like characters designate like or corresponding parts throughout the several views, and in which:—

Figure 1:
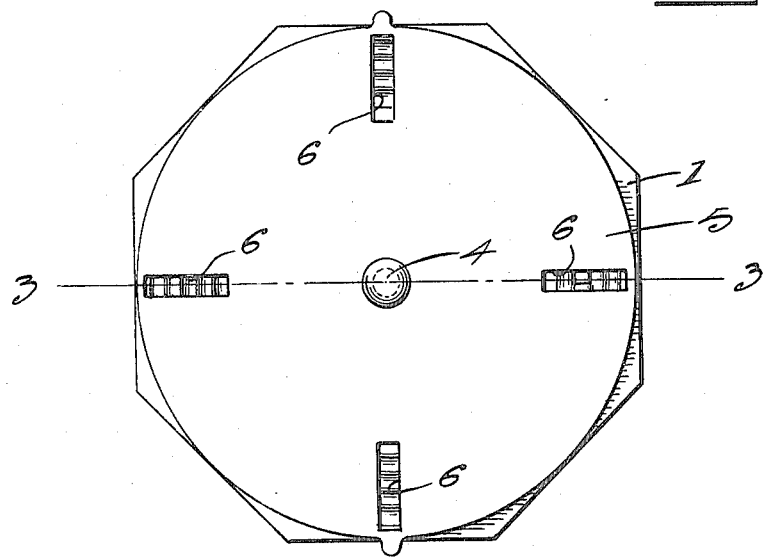
Figure 2:
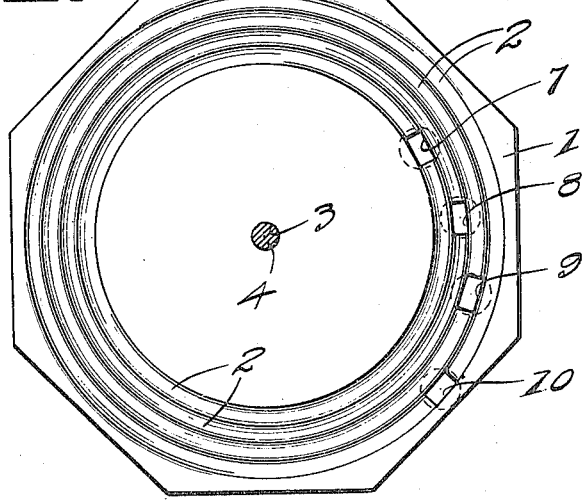
Figure 3:
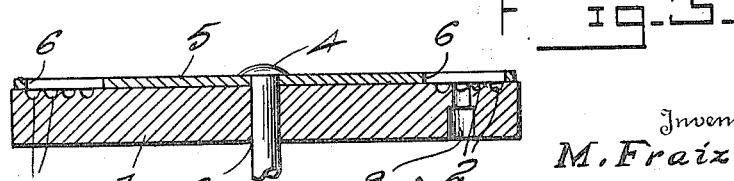

Figure 1 is a top plan view of the improved corn planter attachment. Fig. 2 is a plan view of the grooved plate, and Fig. 3 is a cross sectional view on the line 3—3 of Fig. 1.

Referring more particularly to the drawings, 1 designates a plate, which is shown in the drawings as hexagonal in plan, and which is provided with a plurality of grooves 2 formed in concentric circles in the upper surface or base of the plate. The plate 1 is provided for insertion in an ordinary seed retaining hopper of an ordinary type of corn planter (not shown) and it is provided with an opening 3 formed centrally therein through which a pin 4 extends. The pin 4 has pivotally mounted thereupon a plate 5, which is positioned above the plate 1 and is rotatably carried by the pin. The plate 5 is provided with rectangular openings 6 formed therein at spaced intervals about the circumference thereof and extending longitudinally inwardly toward the central axis of the plate 5, being of such length as to extend completely over the entire line of the groove 2, as is clearly shown in Fig. 1 of the drawings.

The plate 1 is provided with a plurality of openings 7, 8, 9 and 10 formed therein and extending vertically therethrough. The opening 7 is positioned in and communicates with the innermost of the circles 2, the opening 8 with the circle next to the innermost circle, the opening 9 with the next to the outermost circle, and the opening 10 with the outermost circle 2, as is clearly shown by reference to Fig. 2 of the drawings. The various openings 7, 8, 9 and 10 are positioned at spaced intervals about the circumference of the various grooves, so that seeds will be deposited therethrough at spaced intervals for planting the seeds in the hills. The plate 5 may be rotated by the ordinary type of mechanism used for rotating the seed dispensing plate in ordinary corn planters.

In the operation of the improved seed dispensing plate heretofore described; the plate 1 is positioned within the bottom of the retaining hopper, and held against rotation, while the plate 5 is rotatably supported thereabove. The seed will fall within the opening 6, pass therethrough and feed themselves in various of the grooves 2, which grooves are of such size as to hold a single seed within each of the openings. During the rotation of the disk or plate 5 the various openings will travel about the pin 4 as an axis, and when they aline with the various openings 7, 8, 9 and 10, a seed will be dropped through these respective openings, upon the ground over which the planter is traveling.

In reducing the invention to practice certain minor features of construction, combination and arrangement of parts may necessitate alterations to which the patentee is entitled provided such alterations are comprehended within the scope of what is claimed.

What is claimed is:—

1. A seed dispensing mechanism for corn planters embodying a rigid plate and a rotatable plate mounted upon the upper surface of said rigid plate, a plurality of vertically extending openings formed in and extending through said rigid plate at spaced intervals radially from the center of said plate, said rotatable plate being provided with a plurality of substantially rectangular shaped openings extending therethrough and spaced about the circumference thereof, said rectangular openings adapted for alinement with said vertical opening for permitting of the dropping of seed.

2. An attachment for corn planters, the combination of a rigid plate having a plurality of concentric circular grooves formed in the upper space thereof, a plate rotatably carried above the upper face of said rigid plate, said rigid plate being provided with a plurality of vertical openings extending therethrough and communicating with said concentric grooves, said rotary plate being provided with a plurality of circumferentially spaced rectangular openings for alinement with said vertical openings for permitting of the deposit of seed therethrough.

3. In a seed dispensing attachment for corn planters, a rigid plate having a plurality of concentric circular grooves formed in the upper face thereof, said rigid plate being provided with a plurality of vertically extending openings formed therein and communicating with said concentric grooves, said openings being spaced radially from the central axis of said rigid plate and communicating with said concentric grooves at spaced intervals, a rotatable plate positioned above the upper surface of said rigid plate and having a plurality of spaced rectangularly shaped openings formed therein, said openings extending completely across said concentric grooves and adapted for alinement with said vertical openings to permit of the dropping of seeds therethrough.

In testimony whereof I affix my signature in presence of two witnesses.

MARK FRAIZER.

Witnesses:
FRANK H. LETSON,
PHILIP HERALD.

Copies of this patent may be obtained for five cents each, by addressing the "Commissioner of Patents, Washington, D. C."